US008471933B2

(12) United States Patent
Matsushita et al.

(10) Patent No.: US 8,471,933 B2
(45) Date of Patent: Jun. 25, 2013

(54) IMAGE PROCESSING APPARATUS, IMAGE PROCESSING METHOD AND COMPUTER PROGRAM

(75) Inventors: Nobuyuki Matsushita, Kanagawa (JP); Jiro Takatori, Tokyo (JP); Yuki Kawaguchi, Tokyo (JP)

(73) Assignee: Sony Corporation (JP)

( * ) Notice: Subject to any disclaimer, the term of this patent is extended or adjusted under 35 U.S.C. 154(b) by 278 days.

(21) Appl. No.: 12/660,635

(22) Filed: Mar. 2, 2010

(65) Prior Publication Data

US 2010/0231758 A1 Sep. 16, 2010

(30) Foreign Application Priority Data

Mar. 12, 2009 (JP) ................. P2009-060230

(51) Int. Cl.
*H04N 5/217* (2011.01)
(52) U.S. Cl.
USPC ........................................... 348/242
(58) Field of Classification Search
USPC ................. 348/24, 242, 241, 252, 253, 256
See application file for complete search history.

(56) References Cited

U.S. PATENT DOCUMENTS

| 7,525,592 B2* | 4/2009 | Kato ........................... 348/348 |
| 2005/0157206 A1* | 7/2005 | Kato ........................... 348/370 |
| 2006/0038899 A1* | 2/2006 | Tamaru et al. ............... 348/241 |
| 2009/0052797 A1 | 2/2009 | Matsushita et al. |

FOREIGN PATENT DOCUMENTS

| JP | 2005204120 A | 7/2005 |
| JP | 2005-311455 A | 11/2005 |
| JP | 2006060661 A | 3/2006 |
| JP | 2008-153836 A | 7/2008 |

OTHER PUBLICATIONS

Office Action from Japanese Application No. 2009-060230, dated Oct. 2, 2012.

\* cited by examiner

*Primary Examiner* — Aung S Moe
(74) *Attorney, Agent, or Firm* — Lerner, David, Littenberg, Krumholz & Mentlik, LLP

(57) ABSTRACT

An image processing apparatus includes: a first noise removing part which performs color noise removing process for a first color image signal having a predefined color space, a transforming part which transforms the first color image signal subjected to the color noise removing process by the first noise removing part into a second color image signal having a color space including a luminance signal and a color difference signal, and a second noise removing part which performs color noise removing process for the second color image signal.

10 Claims, 6 Drawing Sheets

FIG. 2
| R | Gr | R | Gr | R |
| --- | --- | --- | --- | --- |
| Gb | B | Gb | B | Gb |
| R | Gr | R | Gr | R |
| Gb | B | Gb | B | Gb |
| R | Gr | R | Gr | R |
FIG. 3A
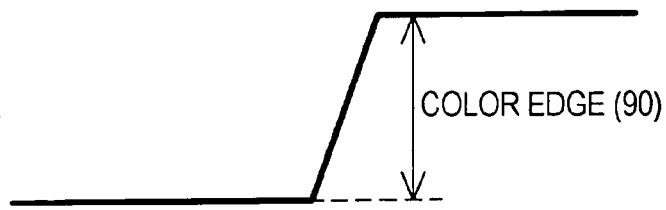
FIG. 3B
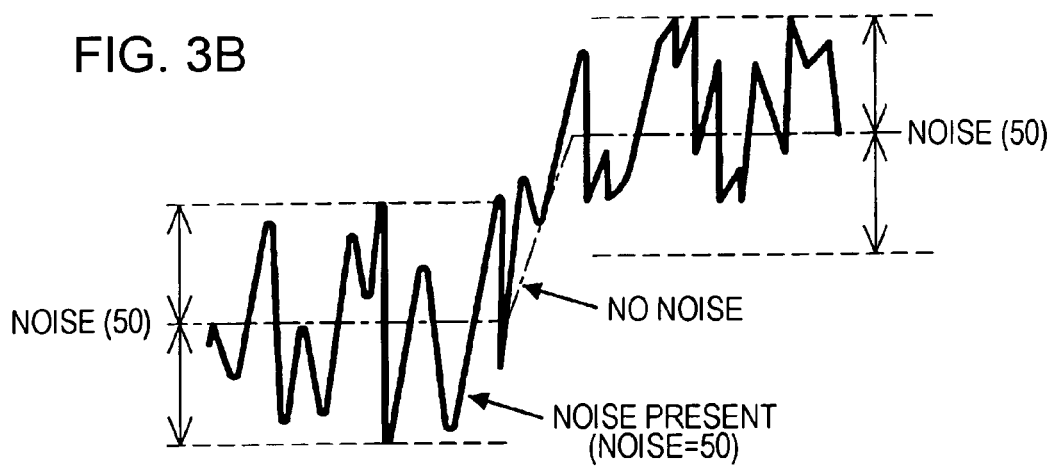

IMAGE PROCESSING APPARATUS, IMAGE PROCESSING METHOD AND COMPUTER PROGRAM

CROSS-REFERENCE TO RELATED APPLICATION

The present application claims priority from Japanese Patent Application No. JP 2009-060230 filed in the Japanese Patent Office on Mar. 12, 2009, the entire content of which is incorporated herein by reference.

BACKGROUND OF THE INVENTION

1. Field of the Invention

The present invention relates to an image processing apparatus, an image processing method and a computer program.

2. Description of the Related Art

Various kinds of noise are contained in raw data output from a charge coupled device (CCD) or a complementary metal oxide semiconductor (CMOS) device which are being used as imaging devices in digital still cameras.

For example, when an image is developed by converting raw data into a signal in a different format, it is necessary that noise contained in the signal after the conversion is effectively removed. For example, when the raw data are converted into image data (for example, YCC data) including luminance signals and color difference signals, image noise may be classified into luminance noise and color noise. It is well known that image quality can be improved by removing such color noise.

As one of methods for removing noise contained in raw data, for example, there has been proposed a method for removing noise from Gr/R/B/Gb data, as disclosed in Japanese Unexamined Patent Application Publication No. 2005-311455. However, when such noise are removed from the Gr/R/B/Gb data, the data may not be separated into luminance signals and color difference signals, the luminance signals may be affected by such a noise removing process. This may result in inauthentic color where an edge portion in which luminance has been changed is colored or has a different luminance.

As another of method for removing color noise, there has been proposed a method for removing noise from YCC (YCrCb) data including luminance signals and color difference signals which are obtained by subjecting raw data to color separation such as de-mosaic process or the like. This method can remove color noise without having an effect on the luminance signals by performing noise removing process for the color difference signals. However, when a high-level de-mosaic process is performed which considers edge direction in a state where significant noise is contained, wrong determination of an edge may be made due to noise. This may result in the inclusion of inauthentic color or color noise in an image after de-mosaic process. In addition, since the YCC data passes through signal processing such as de-mosaic process or the like, the property of noise contained in the color difference signal Cr/Cb may become complicated so that color noise may not be completely removed. In addition, if noise reduction to remove the color noise is strongly carried out, an edge may be dimmed.

For the purpose of addressing this problem, there has been proposed a method for transforming raw data into color difference signals through simple and easy de-mosaic process without considering edge direction, applying noise removing process to remove color noise from the color difference signals, and retransforming the color difference signals into raw data (see Japanese Unexamined Patent Application Publication No. 2008-153836). In this method, YCC data are produced as a high-level de-mosaic process including process based on edge determination is performed for the retransformed raw data after removing the noise. The method disclosed in Japanese Unexamined Patent Application Publication No. 2008-153836 can prevent the color difference signals from being deteriorated based on a wrong determination of an edge due to noise since simple and easy de-mosaic process without considering edge direction is performed to remove color noise.

SUMMARY OF THE INVENTION

However, the method disclosed in Japanese Unexamined Patent Application Publication No. 2008-153836 has a problem in that the separation of the raw data into the luminance signals and the color difference signals by the simple de-mosaic process is different from final separation of the raw data into the luminance signals and the color difference signals and high frequency color noise remains. In addition, the method disclosed in Japanese Unexamined Patent Application Publication No. 2008-153836 has another problem in that the strong noise reduction to remove the color noise has an effect on the luminance signals, which may result in inauthentic color where an edge portion in which luminance has been changed is colored or has a different luminance.

It is therefore desirable to provide a new and improved image processing apparatus, image processing method and computer program, which are capable of removing color noise of an image without losing the sense of color resolution by using different color noise removing processes for color image signals having different characteristics.

According to an embodiment of the present invention, there is provided an image processing apparatus including: a first noise removing part which performs color noise removing process for a first color image signal having a predefined color space; a transforming part which transforms the first color image signal subjected to the color noise removing process by the first noise removing part into a second color image signal having a color space including a luminance signal and a color difference signal; and a second noise removing part which performs color noise removing process for the second color image signal.

With this configuration, the first noise removing part performs color noise removing process for a first color image signal having a predefined color space. The transforming part transforms the first color image signal subjected to the color noise removing process by the first noise removing part into a second color image signal having a color space including a luminance signal and a color difference signal. The second noise removing part performs color noise removing process for the second color image signal. As a result, it is possible to remove color noise of an image without losing the sense of color resolution by using different color noise removing processes for color image signals having different characteristics.

The image processing apparatus may further includes a setting part which sets strengths of the color noise removing processes in the first noise removing part and the second noise removing part.

The setting part may set the strengths of the color noise removing processes in the first noise removing part and the second noise removing part to be the same value.

The setting part may set the strengths based on ISO sensitivity information.

The setting part may set the strengths based on the ISO sensitivity information obtained from the first color image signal.

The setting part may set the strengths based on the ISO sensitivity information obtained from brightness of the first color image signal.

The first noise removing part may include a color difference calculating part which calculates a color difference of the first color image signal, and a color difference noise removing part which removes noise of the color difference calculated by the color difference calculating part.

The transforming part may transform the first color image signal into a Y signal which is the luminance signal and a Cr signal and a Cb signal which is the color difference signal.

The transforming part may transform the first color image signal into a Y signal which is the luminance signal and an U signal and a V signal which is the color difference signal. The predefined color space may be an RGB color space.

According to another embodiment of the present invention, there is provided an image processing method including the steps of: performing color noise removing process for a first color image signal having a predefined color space; transforming the first color image signal subjected to the color noise removing process in the step of performing color noise removing process into a second color image signal having a color space including a luminance signal and a color difference signal; and performing color noise removing process for the second color image signal.

According to still another embodiment of the present invention, there is provided a computer program which prompts a computer to execute the steps of: performing color noise removing process for a first color image signal having a predefined color space; transforming the first color image signal subjected to the color noise removing process in the step of performing color noise removing process into a second color image signal having a color space including a luminance signal and a color difference signal; and performing color noise removing process for the second color image signal.

As described above, the present invention provides a new and improved image processing apparatus, image processing method and computer program, which are capable of removing color noise of an image without losing the sense of color resolution by using different color noise removing processes for color image signals having different characteristics.

BRIEF DESCRIPTION OF THE DRAWINGS

FIG. 2 is an explanatory view illustrating a Bayer array;

FIG. 3A is an explanatory view illustrating a relationship between color noise, a threshold used in color noise removing process, and a color edge;

FIG. 3B is an explanatory view illustrating a relationship between color noise, a threshold used in color noise removing process, and a color edge;

DESCRIPTION OF THE PREFERRED EMBODIMENTS

Figure 1:
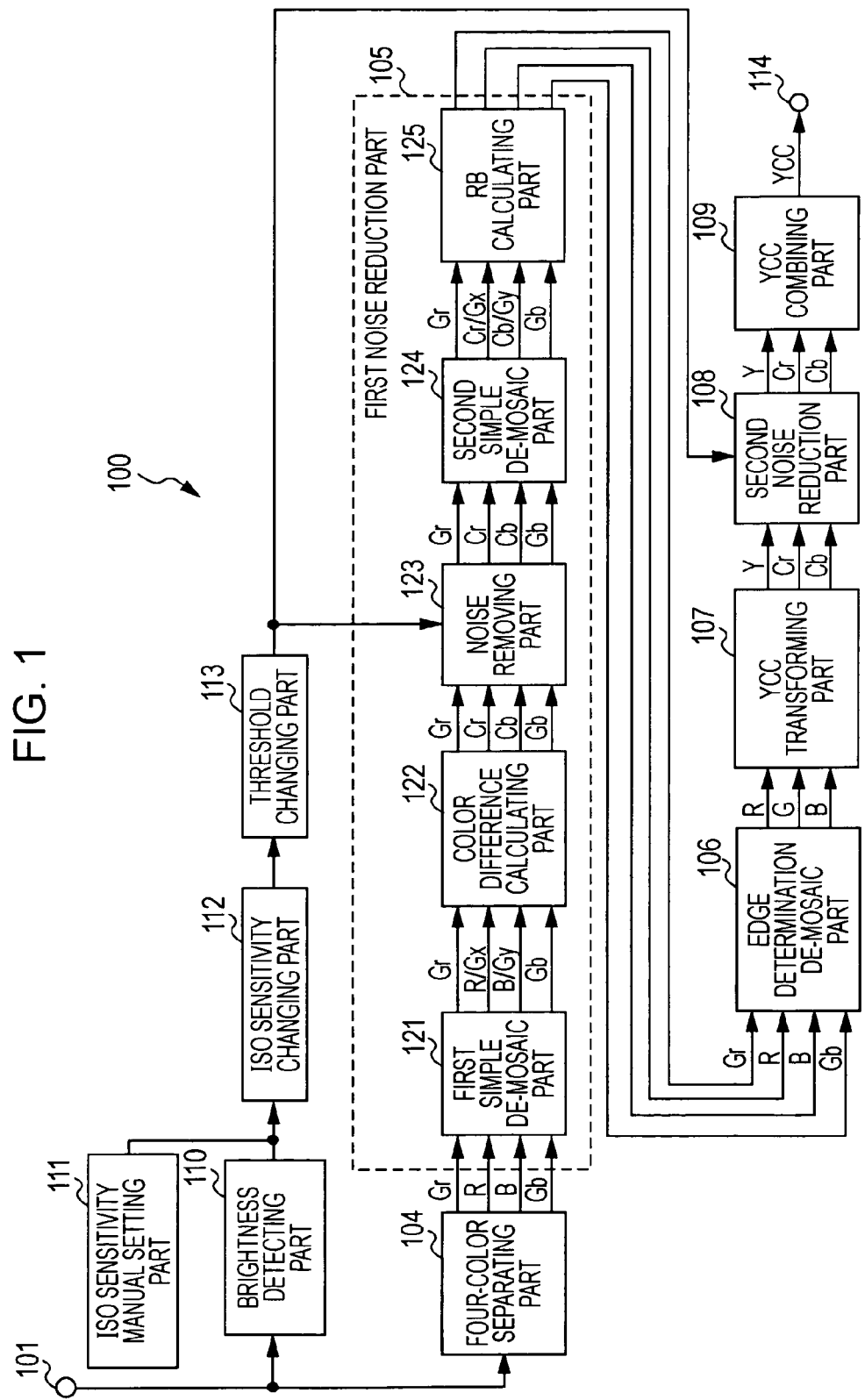
FIG. 1 is an explanatory view illustrating a configuration of an image capturing device according to an embodiment of the present invention.

Hereinafter, preferred embodiments of the present invention will be described in detail with reference to the accompanying drawings. Throughout the specification and the drawings, the same reference numerals denote elements having substantially the same function, explanation of which are not repeated for simplicity and clarity.

Preferred embodiments of the present invention will be described in an order as below:
<1. Embodiment of the Invention>
[1-1. Configuration of Image Capturing Device]
[1-2. Relationship between Color Noise and Color Edge]
[1-3. Color Noise Removing Process]
[1-4. Threshold Setting Method]
<2. Conclusion>

1. EMBODIMENT OF THE INVENTION 1-1. Configuration of Image Capturing Device

A configuration of an image capturing device according to an embodiment of the present invention will be first described. FIG. 1 is an explanatory view illustrating a configuration of an image capturing device 100 according to an embodiment of the present invention. Hereinafter, a configuration of the image capturing device 100 according to the embodiment of the present invention will be described with reference to FIG. 1.

As shown in FIG. 1, the image capturing device 100 according to this embodiment of the present invention includes a Bayer input terminal 101, a four-color separating part 104, a first noise reduction part 105, an edge determination de-mosaic part 106, a YCC transforming part 107, a second noise reduction part 108, a YCC combining part 109, a brightness detecting part 110, an ISO sensitivity manual setting part 111, an ISO sensitivity changing part 112, a threshold changing part 113 and an output terminal 114.

The Bayer input terminal 101 is a terminal for inputting a color image signal having a predefined color space. In this embodiment, light from a subject, which is condensed through a lens (not shown), is irradiated on an image capturing device (not shown) such as a CMOS sensor, a CCD image sensor or the like. Raw data can be obtained by converting the light irradiated on the image capturing device into an electrical signal after passing color filters having a mosaic-shaped Bayer array. The raw data input to the Bayer input terminal 101 are sent to the four-color separating part 104.

FIG. 2 is an explanatory view illustrating a Bayer array. As shown in FIG. 2, a Bayer array is a pixel array with horizontal two pixels×vertical two pixels as a basic block. More specifically, the Bayer array is a pixel array having basic blocks periodically arranged, in each of which two green pixels (Gr and Gb) are arranged on one diagonal and a red pixel (R) and a blue pixel (B) are arranged on the other diagonal.

The four-color separating part 104 separates the image data Gr, Gb, R and B included in the raw data into four kinds of image data included in the basic block of vertical two pixels× horizontal two pixels in the Bayer array shown in FIG. 2. The four kinds of image data separated in the four-color separating part 104 are sent to the first noise reduction part 105 after they are subjected to white balance adjustment.

The first noise reduction part 105 performs color noise removing process for the raw data separated into the four kinds of image data by the four-color separating part 104. As shown in FIG. 1, the first noise reduction part 105 includes a first simple de-mosaic part 121, a color difference calculating part 122, a noise removing part 123, a second simple de-mosaic part 124 and an RB calculating part 125.

The first simple de-mosaic part 121 performs simple de-mosaic process for the raw data separated into the four kinds of image data by the four-color separating part 104. "Simple" used herein means that calculating process is simplified as compared to a typical de-mosaic process. The first simple de-mosaic part 121 performs complementary calculating process using pixel values of adjacent green pixels Gr and Gb to calculate pixel values of green at locations on spaces of red pixel R and blue pixel B. For example, a green pixel value Gx at a location on a red pixel R space is obtained by averaging four pixels Gr and Gb adjacent to a pixel R. Likewise, a green pixel value Gy at a location on a blue pixel B space is obtained by averaging four pixels Gr and Gb adjacent to a pixel B. The pixel values Gx and Gy obtained by the simple de-mosaic process in the first simple de-mosaic part 121 are sent to the color difference calculating part 122 along with the pixel values Gr, Gb, R and B output from the four-color separating part 104.

The color difference calculating part 122 uses the pixel values of the pixels output from the first simple de-mosaic part 121 to generate pixel values for color noise removal, which indicate pixel values of the red and blue pixels. More specifically, in this embodiment, the color difference calculating part 122 calculates a color difference using the pixel values Gr, Gb, R, B, Gx and Gy output from the first simple de-mosaic part 121. The pixel values calculated in the color difference calculating part 122 are applied as pixel values for color noise removal.

The color difference calculating part 122 calculate a color difference for both of the red pixel R and the blue pixel B. As a result, the color difference calculating part 122 converts the pixel value of the red pixel R and the pixel value of the blue pixel B respectively into color difference pixel values Cr and Cb on the basis of the green pixel value. That is, for the red pixel, a value of (R−Gx) becomes a color difference Cr of the red pixel, while, for the blue pixel, a value of (B−Gy) becomes a color difference Cb of the blue pixel. The pixel values for color noise removal indicating the red pixel value and the blue pixel value generated in the color difference calculating part 122 are sent to the noise removing part 123.

The noise removing part 123 performs color noise removing process for the color difference pixel value Cr and the color difference pixel value Cb calculated by the color difference calculating part 122. The noise removing part 123 may use a E filter to perform color noise removing process for removing noise from the color difference pixel values Cr and Cb, for example, as described in Japanese Unexamined Patent Application Publication No. 2008-153836.

In addition, in this embodiment, the threshold changing part 113 may change a color noise removal threshold to be used for the color noise removing process in the noise removing part 123. In addition, in this embodiment, the color noise removal threshold to be used for the color noise removing process indicates a degree of strength of the color noise removing process. Color noise can be effectively removed by changing the color noise removal threshold by means of the threshold changing part 113. In addition, a relationship between the color noise removal threshold and the color noise removing process will be described in detail later. When color noise are removed by the noise removing part 123, each image signal is sent to the second simple de-mosaic part 124.

Upon receiving the signal with color noise removed by the noise removing part 123, the second simple de-mosaic part 124 performs interpolation calculating process to calculate green pixel values Gx and Gy at locations on spaces of the red pixel R and the blue pixel B, similar to in the first simple de-mosaic part 121. A green pixel value Gx at a location on the red pixel R space is obtained by averaging values of four green pixels adjacent to the red pixel R. Likewise, a green pixel value Gy at a location on the blue pixel B space is obtained by averaging values of four green pixels adjacent to the blue pixel B. The green pixel values Gx and Gy at the locations on the red pixel R and blue pixel B spaces, which are calculated in the second simple de-mosaic part 124, are sent to the RB calculating part 125 along with the green pixel values Gr and Gb at the location on the green pixel space.

The RB calculating part 125 uses the green pixel values Gx and Gy at the locations on the red pixel R and blue pixel B spaces, which are calculated in the second simple de-mosaic part 124, to calculate pixel values of the red pixel R and the blue pixel B. That is, the RB calculating part 125 calculates a pixel value of the red pixel R by adding the green pixel Gx at the location on the red pixel R space, which is calculated in the second simple de-mosaic part 124, to a color difference of the green pixel. Likewise, the RB calculating part 125 calculates a pixel value of the blue pixel B by adding the green pixel Gy at the location on the blue pixel B space, which is calculated in the second simple de-mosaic part 124, to a color difference of the green pixel. After the pixel values of the red pixel R and the blue pixel B are calculated in the RB calculating part 125, image data of the pixels are sent to the edge determination de-mosaic part 106.

The edge determination de-mosaic part 106 performs de-mosaic process for the image data output from the first noise reduction part 105. As the de-mosaic process is performed in the edge determination de-mosaic part 106, full color image data including red, green and blue color data R, G and B at locations on spaces of pixels of the image capturing device.

In addition, the edge determination de-mosaic part 106 uses pixel values at a location extending in an edge direction to perform interpolation calculating process for pixel values of pixels of interest. In this manner, as the edge determination de-mosaic part 106 performs the interpolation calculating process, edges can be reproduced with high precision. The full color image data generated in the edge determination de-mosaic part 106 are sent to the YCC transforming part 107.

The YCC transforming part 107 transforms the full color image data generated in the edge determination de-mosaic part 106 into YCC (Y/Cb/Cr) data including a luminance signal and a color difference signal. In addition, the YCC transforming part 107 may transform the full color image data into the YCC data using, for example, the following equations 1 to 3.

$$Y = 0.29891 \times R + 0.58661 \times G + 0.11448 \times B \quad \text{[Equation 1]}$$

$$Cb = -0.16874 \times R - 0.33126 \times G + 0.50000 \times B \quad \text{[Equation 2]}$$

$$Cr = 0.50000 \times R - 0.41869 \times G - 0.08131 \times B \quad \text{[Equation 3]}$$

The YCC data generated by the YCC transforming part 107 are sent to the second noise reduction part 108.

The second noise reduction part 108 performs color noise removing process for the YCC data. In this embodiment, the second noise reduction part 108 performs color noise removing process for color difference signals (Cb/Cr signals) included in the YCC data generated by the YCC transforming part 107.

In addition, in this embodiment, the threshold changing part 113 may change a color noise removal threshold to be used for the color noise removing process in the second noise reduction part 108. Low frequency color noise can be effectively removed by changing the color noise removal threshold used in the second noise reduction part 108 by means of the threshold changing part 113. In addition, a relationship between the color noise removal threshold and the color noise removing process will be described in detail later. When color noise contained in the YCC data are removed by the second noise reduction part 108, the YCC data subjected to the color noise removing process are sent to the YCC combining part 109.

The YCC combining part 109 combines the YCC data, which has had noise of the color difference signal removed in the second noise reduction part 108, to generate image data of one channel. The image data generated in the YCC combining part 109 are output from the output terminal 114. The image data output from the output terminal 114 are sent to, for example, an encoder (not shown) for encoding process. An image subjected to the encoding process is displayed on an image display unit (not shown) for image display and is recorded in a recording medium.

The brightness detecting part 110 detects brightness of a subject when the image capturing device 100 captures an image. In this embodiment, the image capturing device 100 detects the brightness of the subject using the raw data input to the Bayer input terminal 101. As the brightness of the subject is detected in the brightness detecting part 110, the ISO sensitivity changing part 112, which will be described later, may change ISO sensitivity depending on the brightness of the subject.

The ISO sensitivity manual setting part 111 sets ISO sensitivity of a subject image by a user when the image is captured by the image capturing device 100. The ISO sensitivity set by the user is sent to the ISO sensitivity changing part 112.

The ISO sensitivity changing part 112 sets the ISO sensitivity using the subject brightness detected in the brightness detecting part 110 or using settings in the ISO sensitivity manual setting part 111. In this embodiment, a threshold to be used for the noise removing process of the first noise reduction part 105 and the second noise reduction part 108 is set based on the ISO sensitivity set by the ISO sensitivity changing part 112. Information on the ISO sensitivity set by the ISO sensitivity changing part 112 is sent to the threshold changing part 113.

In this embodiment, although the ISO sensitivity changing part 112 sets the ISO sensitivity using the subject brightness detected in the brightness detecting part 110, the present invention is not limited thereto. For example, when the ISO sensitivity is set using the subject brightness, the ISO sensitivity changing part 112 may set the ISO sensitivity using, for example, image data of Gr of four image data Gr, Gb, R and B which are separated in the four-color separating part 104.

Upon receiving the information on the ISO sensitivity set by the ISO sensitivity changing part 112, the threshold changing part 113 sets the threshold to be used for the color noise removing process of the first noise reduction part 105 and the second noise reduction part 108 based on the ISO sensitivity. Information on the threshold set by the threshold changing part 113 is sent to the first noise reduction part 105 and the second noise reduction part 108. The threshold information sent to the first noise reduction part 105 is input to the noise removing part 123.

When the threshold to be used for the color noise removing process is set, the threshold changing part 113 may set the threshold in advance within the threshold changing part 113 or by reading information on the threshold based on input ISO sensitivity from a table provided in the outside of the threshold changing part 113.

Hitherto, the configuration of the image capturing device 100 according to the embodiment of the present invention has been described. Next, the color noise removing process using the image capturing device 100 according to the embodiment of the present invention will be described.

1-2. Relationship Between Color Noise and Color Edge

First, as a basis for detailed description of the color noise removing process using the image capturing device 100 according to the embodiment of the present invention, a relationship between color noise, a threshold used for the color noise removing process, and a color edge will be described. FIGS. 3A to 3E, 4A and 4B are explanatory views illustrating a relationship between color noise, a threshold used in the color noise removing process, and a color edge.

FIG. 3A is an explanatory view illustrating an example of a color edge in an ideal state where an edge portion in color signal Cr and Cb (hereinafter, a relevant edge portion is referred to as "color edge portion") has no color noise. FIG. 3A shows an example of a color edge where, for example, a difference between a value of a color signal Cr (or Cb) and a value of an adjacent color signal Cr (or Cb) is 90.

FIG. 3B is an explanatory view illustrating an example of a state where the color edge portion has color noise shown in FIG. 3A. FIG. 3B shows a case where a color edge portion, where, for example, a difference between a value of a color signal Cr (or Cb) and a value of an adjacent color signal Cr (or Cb) is 90, has color noise with the maximum amplitude of 50.

Figure 3C:
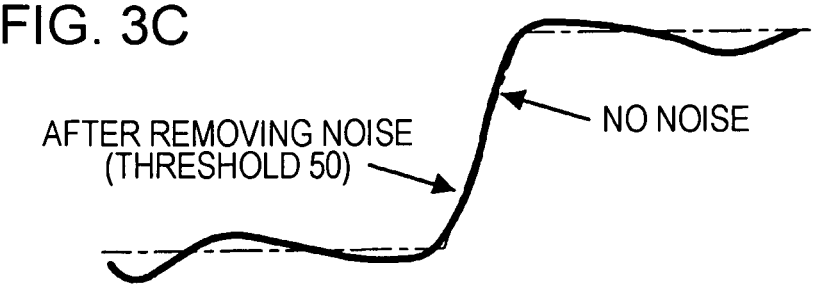
FIG. 3C is an explanatory view illustrating a relationship between color noise, a threshold used in color noise removing process, and a color edge.

As shown in FIG. 3B, in a case where a color edge portion has noise with the maximum amplitude smaller than an edge component of the color edge portion, when the color noise removing process with the threshold of 50 is performed for the color edge portion, a waveform of the color edge portion with the color noise removed therefrom can be made into an ideal state. In this embodiment, the threshold of the color noise removing process indicates the strength of the color noise removing process. FIG. 3C is an explanatory view illustrating an example of a waveform of the color edge portion after the color noise is removed from the color edge having the noise shown in FIG. 3B by the color noise removing process with the threshold of 50. As shown in FIG. 3C, assuming that the color edge portion has noise with the maximum amplitude smaller than the color edge, a waveform of the color edge portion with the color noise removed therefrom can be made into an ideal state by the color noise removing process with the threshold smaller than the color edge. By making the waveform of the color edge portion with the color noise removed therefrom into an ideal state, it is possible to maintain the sense of color resolution before and after the color noise removing process.

However, in a case where the color edge portion has noise with the maximum amplitude larger than the edge component of the color edge portion, if the strength of the color noise removing process is increased to remove the noise, the waveform of the color edge portion may be distorted although the noise can be removed. Such distortion of the waveform of the color edge portion prevents the sense of color resolution from being maintained and colors are dimmed. In this embodiment, the increase of the strength of the color noise removing process refers to performing the color noise removing process with a larger threshold.

Figure 3D:
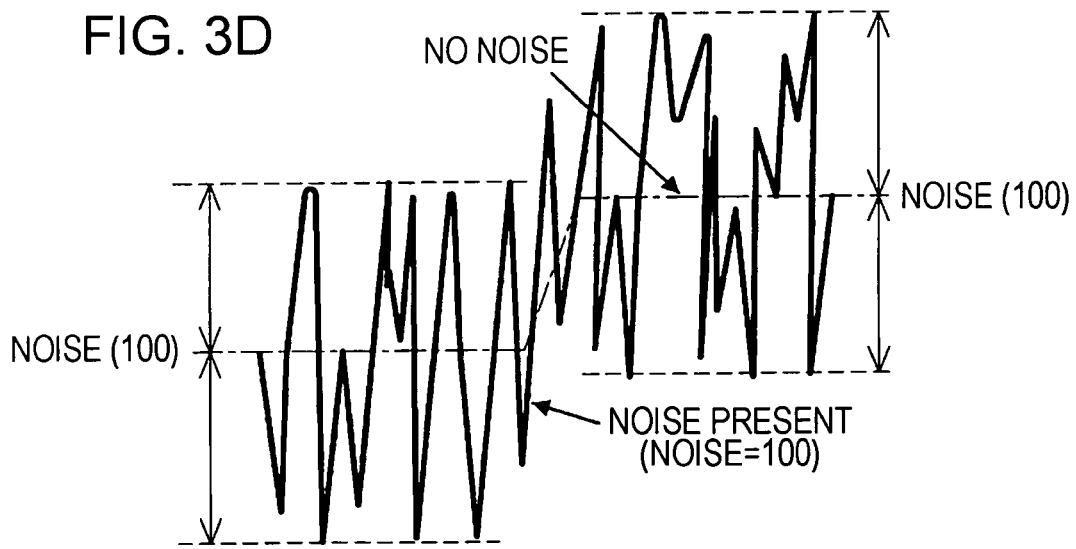
FIG. 3D is an explanatory view illustrating a relationship between color noise, a threshold used in color noise removing process, and a color edge.

FIG. 3D is an explanatory view illustrating an example of a state where the color edge portion shown in FIG. 3A has noise. FIG. 3D shows a case where a color edge, where, for example, a difference between a value of a color signal Cr (or Cb) and a value of an adjacent color signal Cr (or Cb) is 90, has noise with the maximum amplitude of 100.

Figure 3E:
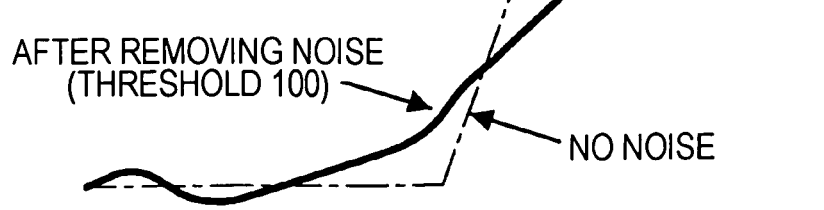
FIG. 3E is an explanatory view illustrating a relationship between color noise, a threshold used in color noise removing process, and a color edge.

As shown in FIG. 3D, assuming that the color edge portion has noise with the maximum amplitude larger than the difference of the color edge portion, when the color noise removing process with the threshold of 100 is performed for the color edge portion, the waveform of the color edge portion may be distorted although the noise can be removed. FIG. 3E is an explanatory view illustrating an example of a waveform of the color edge portion after noise is removed by the noise removing process with the threshold of 100 from a state where a color edge, where a difference between a value of a color signal Cr (or Cb) and a value of an adjacent color signal Cr (or Cb) shown in FIG. 3D is 90, has noise with the maximum amplitude of 100. As shown in FIG. 3E, in a case where the color edge portion has the noise with the maximum amplitude larger than the color edge, when the color noise removing process with the threshold larger than the color edge is performed, the waveform of the color edge portion may be distorted although the noise can be removed.

In this embodiment, therefore, in the case where the color edge portion has the noise with the maximum amplitude larger than the color edge, by performing two steps of the color noise removing process, the noise is removed without distorting the waveform of the color edge portion.

Figure 4A:
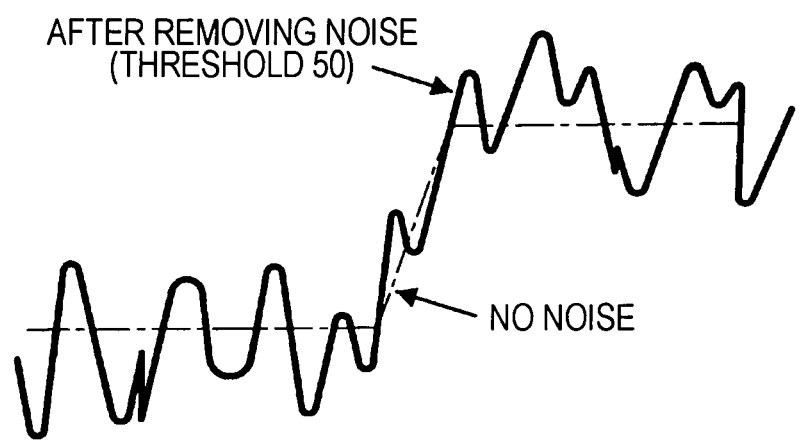
FIG. 4A is an explanatory view illustrating a relationship between color noise, a threshold used in color noise removing process, and a color edge.

FIG. 4A is an explanatory view illustrating an example of a waveform after color noise is removed by the noise removing process with the threshold of 50 from a state where a color edge, which has the difference of 90 shown in FIG. 3D, has noise with the maximum amplitude of 100. As shown in FIG. 4A, although the color noise removing process with the threshold of 50 is performed for the color noise with the maximum amplitude of 100, noise may not be completely removed with noise with the maximum amplitude of 50 left. However, by performing the color noise removing process with the threshold of 50 for the waveform shown in FIG. 3D, it is possible to maintain the waveform of the color edge portion, with the color noise removed therefrom, at a state close to an ideal waveform with no noise.

Figure 4B:
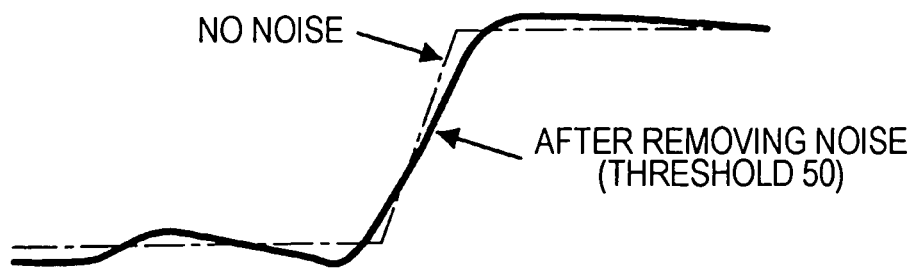
FIG. 4B is an explanatory view illustrating a relationship between color noise, a threshold used in color noise removing process, and a color edge.

FIG. 4B is an explanatory view illustrating an example of a waveform after color noise is removed by the noise removing process with the threshold of 50 performed for a waveform of the color edge portion having the noise shown in FIG. 4A. As shown in FIG. 4B, in a case where the color edge portion has the noise with the maximum amplitude smaller than the color edge, the waveform with the noise removed from the color edge portion by the color noise removing process with the threshold smaller than the color edge can be maintained as an ideal waveform with no noise.

The maximum amplitude of noise is varied by various factors. One factors having an effect on the maximum amplitude of noise is ISO sensitivity of a captured image. Increasing of the ISO sensitivity in image capturing makes it possible to capture an image of a subject in a location with less light or a subject moving at a high speed, but adversely much noise is imposed on the captured image. In this embodiment, therefore, the image capturing device 100 sets a threshold to be used for the color noise removing process from ISO sensitivity of the captured image or ISO sensitivity specified by user's image capturing operation. In addition, in this embodiment, the image capturing device 100 uses a set threshold to perform two steps of the color noise removing process based on the ISO sensitivity in image capturing.

Hitherto, the relationship between the color noise, the threshold used for the color noise removing process, and the color edge has been described. Subsequently, the color noise removing process using the image capturing device 100 according to an embodiment of the present invention will be described in detail.

1-3. Color Noise Removing Process

Figure 5:
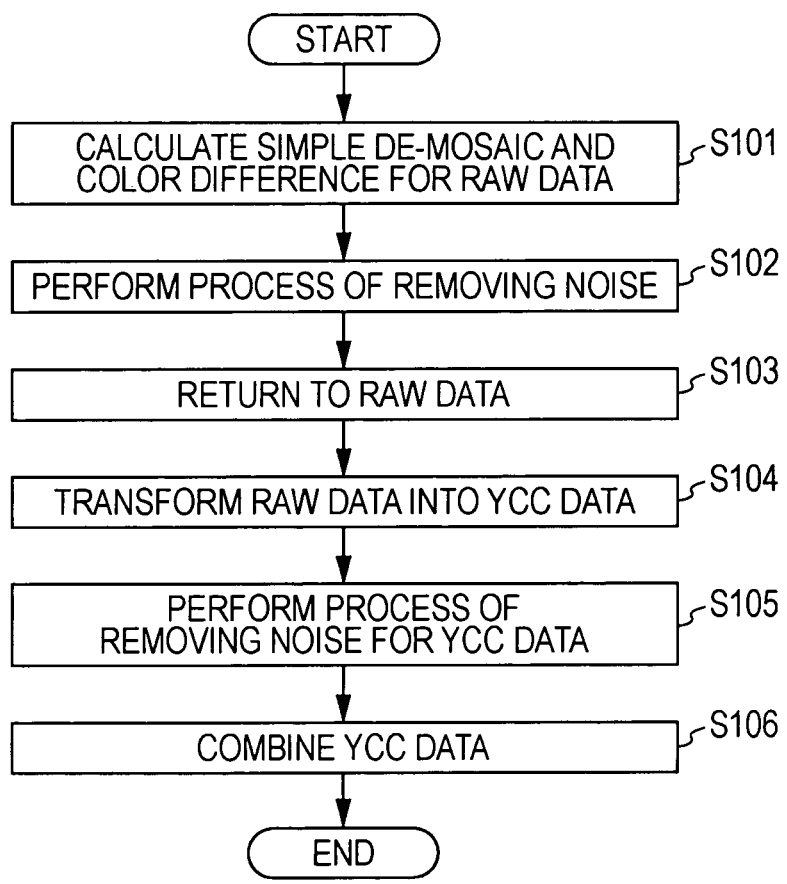
FIG. 5 is a flow chart illustrating color noise removing process using an image capturing device according to an embodiment of the present invention.

FIG. 5 is a flow chart illustrating the color noise removing process using the image capturing device 100 according to an embodiment of the present invention. Hereinafter, the color noise removing process using the image capturing device 100 according to an embodiment of the present invention will be described with reference to FIG. 5.

When the image capturing device 100 captures an image of a subject and raw data are input to the Bayer input terminal 101, the input raw data are sent to the four-color separating part 104. The raw data input to the four-color separating part 104 are separated into the four kinds of image data of Gr, Gb, R and B which are then output to the first noise reduction part 105.

Upon receiving the four kinds of image data of Gr, Gb, R and B, the first simple de-mosaic part 121 in the first noise reduction part 105 performs simple de-mosaic process using the image data. Then, based on the image data subjected to the simple de-mosaic process in the first simple de-mosaic part 121, the color difference calculating part 122 calculates a color difference for the red pixel R and the blue pixel B (Step S101).

Once the color difference calculating part 122 has calculated the color difference for the red pixel R and the blue pixel B, the noise removing part 123 subsequently performs color noise removing process for each of red and blue color differences calculated in the color difference calculating part 122 (Step S102). Here, the noise removing part 123 performs the color noise removing process using a preset threshold. The threshold used for the color noise removing process by the noise removing part 123 is set by the threshold changing part 113.

After the noise removing part 123 performs the color noise removing process, a signal subjected to the color noise removing process is returned to full color image data of R, G and B by the second simple de-mosaic part 124, the RB calculating part 125 and the edge determination de-mosaic part 106 (Step S103). More specifically, first, the second simple de-mosaic part 124 performs interpolation calculating process to calculate pixel values Gx and Gy of green at locations on spaces of the red pixel R and the blue pixel B. Next, the RB calculating part 125 uses the pixel values Gx and Gy of green at locations on spaces of the red pixel R and the blue pixel B to calculate pixel values of the red pixel R and the blue pixel B. Then, the edge determination de-mosaic part 106 generates the full color image data of red, green and blue color data R, G and B at locations of spaces of pixels of the image capturing device.

Once the full color image data of R, G and B have been produced by the second simple de-mosaic part 124, the RB calculating part 125 and the edge determination de-mosaic part 106, the full color image data are subsequently transformed into YCC data including a luminance signal and a color difference signal (Step S104). The transformation of the full color image data into the YCC data are made by the YCC transforming part 107. The YCC transforming part 107 transforms the full color image data into the YCC data using, for example, the above-described equations 1 to 3.

Once the full color image data have been transformed into the YCC data, the second noise reduction part 108 subsequently performs the color noise removing process for the YCC data (Step S108). In this embodiment, the second noise reduction part 108 performs the color noise removing process for the color difference signal (Cb/Cr signal) included in the YCC data produced by the YCC transforming part 107 (Step S105).

Here, the second noise reduction part 108 performs the color noise removing process using a preset threshold. The threshold to be used for the color noise removing process by the second noise reduction part 108 is set by the threshold changing part 113.

Once the second noise reduction part 108 has performed the color noise removing process for the YCC data, the YCC combining part 109 combines the YCC data with noise of the color difference signal removed therefrom to generate image data (Step S106).

In this manner, the color noise removing process using the image capturing device 100 according to the embodiment of the present invention is performed in two parts, that is, the first noise reduction part 105 and the second noise reduction part 108. By performing two steps of the color noise removing process for the color noise contained in the raw data, which is generated as a result of image capturing process by the image capturing device 100, it is possible to effectively remove color noise even when color noise exceeding a difference between pixel values of a color edge portion is contained in the raw data.

1-4. Threshold Setting Method

Figure 6:
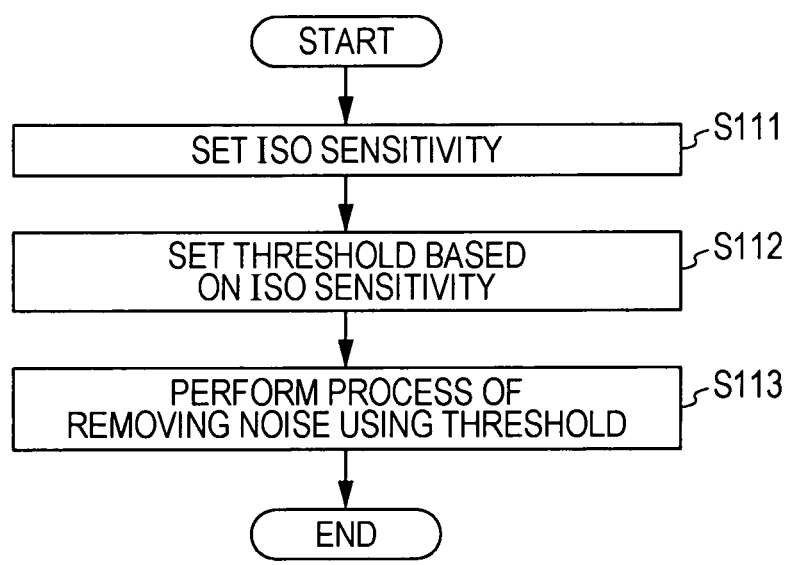
FIG. 6 is a flow chart illustrating a method of setting a threshold in color noise removing process using an image capturing device according to an embodiment of the present invention.

Subsequently, a threshold setting method in the color noise removing process using the image capturing device 100 according to the embodiment of the present invention will be described. FIG. 6 is a flow chart illustrating a method of setting a threshold in the color noise removing process using the image capturing device 100 according to the embodiment of the present invention.

First, the ISO sensitivity changing part 112 sets ISO sensitivity (Step S111). The ISO sensitivity changing part 112 may set the ISO sensitivity of the raw data using, for example, ISO sensitivity derived from the raw data input to the brightness detecting part 110. In addition, the ISO sensitivity changing part 112 may set the ISO sensitivity of the raw data using ISO sensitivity set in the ISO sensitivity manual setting part 111. Information on the ISO sensitivity set by the ISO sensitivity changing part 112 is sent to the threshold changing part 113.

Once the ISO sensitivity has been set by the ISO sensitivity changing part 112 in Step S111, the threshold changing part 113 subsequently sets a threshold to be used for the color noise removing process based on the set ISO sensitivity (Step S112). The threshold changing part 113 sets a larger threshold for higher ISO sensitivity and a smaller threshold for lower ISO sensitivity. Once the threshold changing part 113 has set the threshold, the threshold changing part 113 sends the set threshold to the first noise reduction part 105 and the second noise reduction part 108. Each of the first noise reduction part 105 and the second noise reduction part 108 performs the color noise removing process based on the threshold sent from the threshold changing part 113 (Step S113).

Hereinafter, a relationship between the ISO sensitivity and the threshold will be described by way using examples. If the ISO sensitivity is set as 100 by the ISO sensitivity changing part 112, the threshold changing part 113 sets a threshold to be used for the color noise removing process in the first noise reduction part 105 and a threshold to be used for the color noise removing process in the second noise reduction part 108 as 50, for example. The first noise reduction part 105 and the second noise reduction part 108 perform the respective color noise removing process based on the thresholds set in the threshold changing part 113.

If the ISO sensitivity is set as 200 by the ISO sensitivity changing part 112, the threshold changing part 113 sets thresholds different from the above case for the first noise reduction part 105 and the second noise reduction part 108. The threshold changing part 113 sets a threshold to be used for the color noise removing process in the first noise reduction part 105 and a threshold to be used for the color noise removing process in the second noise reduction part 108 as 100, for example. The first noise reduction part 105 and the second noise reduction part 108 perform the respective color noise removing process based on the thresholds set in the threshold changing part 113.

Similarly, if the ISO sensitivity is set as 400 by the ISO sensitivity changing part 112, thresholds to be used for the color noise removing process are set as 200, and, if the ISO sensitivity is set as 800, thresholds to be used for the color noise removing process are set as 400. In this manner, the threshold changing part 113 sets a value equal to half of the set ISO sensitivity as the thresholds to be used for the color noise removing processes in the first noise reduction part 105 and the second noise reduction part 108. As a result, by setting thresholds based on the ISO sensitivity, it is possible to perform different color noise removing processes depending on the amount of color noise contained in the raw data. In addition, by setting thresholds in this manner, as shown in FIGS. 4A and 4B, it is possible to remove color noise so that a waveform of a color edge portion with color noise removed therefrom is made into an ideal state. By removing the color noise so that the waveform of the color edge portion with color noise removed therefrom is made into an ideal state, it is possible to maintain the sense of color resolution before and after the color noise removing process.

In this embodiment, although a value equal to half of the set ISO sensitivity is set as the thresholds to be used for the color noise removing processes in the first noise reduction part 105 and the second noise reduction part 108, it should be understood that the present invention is not limited to such an example. The threshold changing part 113 may set different thresholds in the first noise reduction part 105 and the second noise reduction part 108.

In addition, for example, if small color noise is contained in the raw data, the threshold changing part 113 may set a threshold to be used for the color noise removing process in the first noise reduction part 105 and a threshold to be used for the color noise removing process in the second noise reduction part 108 as a value smaller than half the set ISO sensitivity. For example, even when the ISO sensitivity is set as 100 by the ISO sensitivity changing part 112, if color noise contained in the raw data can be removed with a threshold corresponding to a value equal to half of the set ISO sensitivity, the threshold changing part 113 may set a threshold to be used for the color noise removing process in the first noise reduction part 105 and a threshold to be used for the color noise removing process in the second noise reduction part 108 as 25, for example.

In addition, for example, if small color noise is contained in the raw data, the threshold changing part 113 may set a threshold for one of the first noise reduction part 105 and the second noise reduction part 108. For example, assume that the ISO sensitivity is set as 100 by the ISO sensitivity changing part 112 and the raw data contains color noise with amplitude smaller than a difference between pixel values of a color edge portion. In this case, thresholds may be set as 50 for the first noise reduction part 105 and the second noise reduction part 108, respectively, or a threshold may be set as 100 for one of the first noise reduction part 105 and the second noise reduction part 108.

In addition, if small color noise is contained in the raw data and color noise can be sufficiently removed with the color noise removing process by one of either the first noise reduction part 105 or the second noise reduction part 108, the color noise removing process may be performed in both the first noise reduction part 105 and the second noise reduction part 108, or the color noise removing process may be performed in only the first noise reduction part 105 while no color noise removing process is performed in the second noise reduction part 108. If the first noise reduction part 105 and the second noise reduction part 108 are implemented by hardware, it is possible to suppress power consumption and shorten processing time taken for the color noise removing process by causing no color noise removing process to be performed in the second noise reduction part 108.

Hitherto, the threshold setting method in the color noise removing process using the image capturing device 100 according to the embodiment of the present invention has been described.

2. CONCLUSION

As described above, according to the embodiment of the present invention, the color noise removing process to remove color noise contained in the raw data is performed in the first noise reduction part 105 and the second noise reduction part 108. The first noise reduction part 105 performs the color noise removing process for the raw data while the second noise reduction part 108 performs the color noise removing process for the YCC data. The first noise reduction part 105 and the second noise reduction part 108 perform the color noise removing processes based on thresholds set by the threshold changing part 113.

In a case where the color noise removing process is performed for only the raw data by the first noise reduction part 105, the increased strength of the color noise removing process may remove low frequency color noise but may lose the sense of color resolution. Increasing the strength of the color noise removing process in such a manner that the sense of color resolution is not lost may not completely remove low frequency color noise. Similarly, in a case where the color noise removing process is performed for only the YCC data by the second noise reduction part 108, the increased strength of the color noise removing process may remove low frequency color noise but the sense of color resolution may be lost. Increasing the strength of the color noise removing process in such a manner that the sense of color resolution is not lost may not completely remove low frequency color noise.

The image capturing device 100 according to this embodiment performs the color noise removing process for the raw data by means of the first noise reduction part 105 and the color noise removing process for the YCC data by means of the second noise reduction part 108. The strength of each of the color noise removing processes is adjusted in such a manner that the sense of color resolution is not lost. As one example, as shown in FIGS. 4A and 4B, the color noise removing process is performed based on a color noise removal threshold which does not exceed a difference between pixel values of a color edge portion. By performing twice the color noise removing processes having different characteristics, it is possible to remove low frequency color noise, which could not be removed in the past, without distorting a waveform of the color edge portion.

In addition, the threshold changing part 113 may set the thresholds used for the color noise removing processes in the first noise reduction part 105 and the second noise reduction part 108 based on the ISO sensitivity. Information on the ISO sensitivity used when the threshold changing part 113 sets the thresholds may be set by analyzing the input raw data or may be set by a user. By setting the thresholds based on the ISO sensitivity, the first noise reduction part 105 and the second noise reduction part 108 can perform the respective color noise removing processes depending on the amount of noise contained in the raw data.

The color noise removing process using the image capturing device 100 according to the above-described embodiment of the present invention may be performed by means of either hardware or software. In a case where the color noise removing process is performed by means of software, for example, a recording medium having a program stored therein may be built in the image capturing device 100. Such a program may be read out and sequentially executed by a central processing unit (CPU), a digital signal processor (DSP) or other controllers built in the image capturing device 100.

Although the preferred embodiment of the present invention has been hitherto described in the above with reference the accompanying drawings, the present invention is not limited to the disclosed embodiment. It is apparent to those skilled in the art to which the present invention belongs that various modifications and alterations may be made without departing from the spirit and scope of the invention and it is understood that such modifications and alterations are included in the technical scope of the invention.

For example, although it has been illustrated in the above embodiment that the color noise removing processes are performed for the image data captured by the image capturing device 100 in the first noise reduction part 105 and the second noise reduction part 108 provided within the image capturing device 100, the present invention is not limited to such an example. For example, the raw data obtained by image capturing process of the image capturing device may be input to a color image signal input part provided in a personal computer or other information processing apparatuses through a recording medium having the raw data stored therein or a network. Furthermore, the first noise reduction part 105 and the second noise reduction part 108 described in the above embodiment may be provided within an information processing apparatus to which the raw data are input, and the color noise removing process may be performed in such an information processing apparatus.

In addition, for example, although it has been illustrated in the above embodiment that the first noise reduction part 105 calculates the color differences from the input raw data and performs the color noise removing process for each of the red and blue color differences to remove color nose contained in the raw data, the color noise removing process for the raw data in the present invention is not limited to such an example. In addition, in removing the color noise contained in the raw data, it is preferable to remove the color noise for a color difference component without having an effect on a luminance component.

In addition, for example, although it has been illustrated in the above embodiment that the color image signal subjected to the color noise removing process in the first noise reduction part 105 is the raw data with the Bayer array, the color image signal subjected to the noise removing process in the present invention is not limited to signals with a mosaic-shaped Bayer array. For example, he color image signal may have either a honeycomb-shaped array or a stripe-shaped color array.

Furthermore, for example, although it has been illustrated in the above embodiment that the color noise removing process is performed for the raw data having the RGB color space, the raw data subjected to the color noise removing process are transformed into the YCC data having the YCrCb color space, and additional color noise removing process is performed for the YCC data after the transformation, the color image signal into which the raw data are transformed in the present invention is not limited to such an example. For example, the raw data may be transformed into a color image signal having a YUV, Lab or other color spaces instead of the YCbCr color space, and the color noise removing process may be performed for the color image signal after the transformation.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   a first noise removing part which performs color noise removing process for a first color image signal having a predefined color space;
   a transforming part which transforms the first color image signal subjected to the color noise removing process by the first noise removing part into a second color image signal having a color space including a luminance signal and a color difference signal;
   a second noise removing part which performs color noise removing process for the second color image signal; and
   a setting part which sets strengths of the color noise removing processes in the first noise removing part and the second noise removing part,
   wherein the setting part sets the strengths based on ISO sensitivity information, in which the ISO sensitivity information includes an indication of a set ISO sensitivity value, so as to have a value or values each equal to or less than half of the set ISO sensitivity value.

2. The image processing apparatus according to claim 1, wherein the setting part sets the strengths of the color noise removing processes in the first noise removing part and the second noise removing part as the same value.

3. The image processing apparatus according to claim 1, wherein the setting part sets the strengths based on the ISO sensitivity information obtained from the first color image signal.

4. The image processing apparatus according to claim 3, wherein the setting part sets the strengths based on the ISO sensitivity information obtained from brightness of the first color image signal.

5. The image processing apparatus according to claim 1, wherein the first noise removing part includes:
   a color difference calculating part which calculates a color difference of the first color image signal; and
   a color difference noise removing part which removes noise of the color difference calculated by the color difference calculating part.

6. The image processing apparatus according to claim 1, wherein the transforming part transforms the first color image signal into a Y signal which is the luminance signal and a Cr signal and a Cb signal which is the color difference signal.

7. The image processing apparatus according to claim 1, wherein the transforming part transforms the first color image signal into a Y signal which is the luminance signal and an U signal and a V signal which is the color difference signal.

8. The image processing apparatus according to claim 1, wherein the predefined color space is an RGB color space.

9. An image processing method comprising the steps of:
   performing color noise removing process for a first color image signal having a predefined color space;
   transforming the first color image signal subjected to the color noise removing process in the step of performing color noise removing process into a second color image signal having a color space including a luminance signal and a color difference signal;
   performing color noise removing process for the second color image signal; and
   setting strengths of the color noise removing processes for the first color image signal and the second color image signal,
   wherein the setting step sets the strengths based on ISO sensitivity information, in which the ISO sensitivity information includes an indication of a set ISO sensitivity value, so as to have a value or values each equal to or less than half of the set ISO sensitivity value.

10. A non-transitory computer readable medium having stored thereon a computer program which causes a computer to execute the steps of:
   performing color noise removing process for a first color image signal having a predefined color space;
   transforming the first color image signal subjected to the color noise removing process in the step of performing color noise removing process into a second color image signal having a color space including a luminance signal and a color difference signal;
   performing color noise removing process for the second color image signal; and
   setting strengths of the color noise removing processes for the first color image signal and the second color image signal,
   wherein the setting step sets the strengths based on ISO sensitivity information, in which the ISO sensitivity information includes an indication of a set ISO sensitivity value, so as to have a value or values each equal to or less than half of the set ISO sensitivity value.

* * * * *